Oct. 22, 1963   C. P. ROBERTS ETAL   3,107,468
REPLACEABLE SEALING MACHINE PLUNGER COVER
Filed May 17, 1961
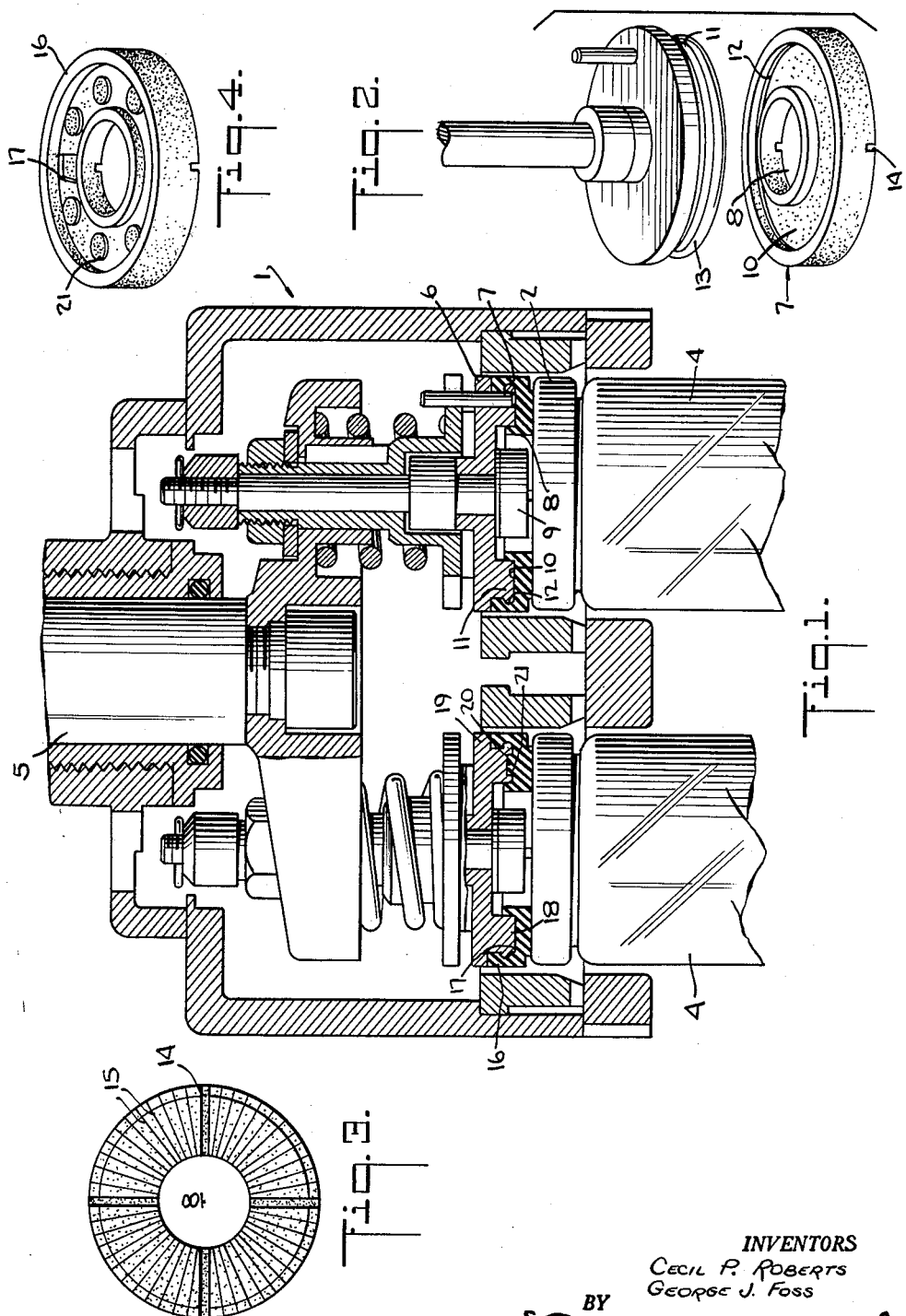
INVENTORS
CECIL P. ROBERTS
GEORGE J. FOSS
BY
ATTORNEY

United States Patent Office 3,107,468
Patented Oct. 22, 1963

3,107,468
REPLACEABLE SEALING MACHINE
PLUNGER COVER
Cecil P. Roberts and George J. Foss, Lancaster, Ohio, assignors to Anchor Hocking Glass Corporation, Lancaster, Ohio, a corporation of Delaware
Filed May 17, 1961, Ser. No. 110,778
19 Claims. (Cl. 53—341)

The present invention relates to an improvement in container sealing machines and more particularly to an improved replaceable friction cover for the sealing heads of sealing machines.

Almost all glass container sealing is now done on automatic machinery which applies closure caps of both the press-on and the screw-on types at extremely high speeds. These closure caps are applied in many cases with sufficient sealing force to provide a hermetic seal so that vacuum sealing may be provided for the containers. Since the appearance of the container closures is important to consumer acceptance, the closures must be applied without scratching or other deformation.

The problem of applying closures rapidly, securely and without scratching or deformation has been solved by using resilient boots or covers on the sealing machine sealing heads which apply the closure pressing and rotating forces. These resilient covers provide a simultaneous friction gripping force and a cushioning effect during the application of the caps to the containers.

Although rubber or other resilient covers have proven satisfactory, the mounting of these covers presents a serious problem. Where the covers have been made soft enough to protect the closures, it has been found necessary to securely mold or otherwise fasten the covers to the sealing head sealing shoe. Since the covers have to be relatively soft they have been found to wear rapidly and to thus require frequent replacement. In order to replace covers which are molded onto the sealing shoe it has been the practice to remove the shoe and to return it to the sealing machine maker for replacement by having a new cover molded and vulcanized in place on the sealing head shoes. This is a time consuming and relatively expensive operation both from the point of view of the actual replacement operation and also in view of the related inoperative sealing machine time required in removing and replacing the sealing head covers on the sealing machine.

Accordingly an object of the present invention is to provide an easily replaced resilient cover for the sealing heads of sealing machines.

Another object of the present invention is to provide a snap-on type of resilient cover for the sealing heads of sealing machine.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side view in section of a sealing machine sealing head illustrating sealing covers in accordance with the present invention;

FIG. 2 is an exploded perspective view of the sealing cover and its mounting shoe in accordance with the present invention;

FIG. 3 is a bottom plan view of the sealing cover in accordance with the present invention; and FIG. 4 is a perspective view of another embodiment of the cover.

FIG. 1 illustrates a sealing head of a sealing machine at 1. Such a sealing head is usually mounted on a rotary turret and as the turret rotates the containers to be sealed are positioned beneath the turret so that a closure 2 held on the sealing head 1 is pressed or turned onto a container 4. In the sealing head 1 illustrated, the mounting rod 5 is being lowered downwardly so that the plungers or shoes 6 are pressing the closures 2 downwardly against the tops of containers 4. In the embodiment of the sealing machine illustrated, the containers 4 are being simultaneously rotated to provide a relative downward and turning motion between each closure 2 and container 4.

A sealing cover 7 in accordance with the present invention is mounted on the mounting shoe 6. The sealing cover 7 provides a cushioned downward sealing force to press the closure 2 downwardly without scratching or otherwise damaging it.

Where the closure 2 is a threaded or lug-type closure, the sealing cover 7 also provides a gripping or friction force to turn the closures 2 onto the container threads.

In both the pressing and the turning motions a certain amount of slippage and consequent wear occurs at the gripping surface of the sealing covers 7. Where the sealing machines are operating at high speeds and handling hundreds of containers per minute this wear, slight as it may be for each individual container, periodically requires a replacement of the sealing cover 7.

The sealing cover 7 illustrated in the drawing is detachably mounted on the mounting shoe 6 to permit it to be stripped off and to be replaced while the mounting shoe 6 remains in place in the sealing head 1.

The sealing cover 7 is molded of rubber or a synthetic rubber-like plastic such as neoprene with the shape best illustrated by the sectional view of the cover 7 in FIG. 1.

The sealing cover 7 is generally ring-shaped with a central circular aperture 8 provided to accommodate a closure retaining magnet 9. The top side of the sealing cover 7 has an upwardly facing mounting channel 10 formed to accommodate the flange 11 of the mounting shoe 6. A locking groove 12 is formed along the outer edge of the channel 10 to receive and engage a complementary locking bead 13 formed on the outside of the mounting shoe flange 11.

It is thus seen that the flange 11 and the locking bead 13 on the mounting shoe 6 engage the complementary mounting channel 10 and the locking groove 12 to hold the sealing cover 7 tightly in position on the mounting shoe 6. At the same time the resilient nature of the sealing cover 7 permits it to be stripped from the mounting shoe 6 for replacement when desired. The resilient nature of the sealing cover 7 prevents unintentional loosening of the sealing cover 7 when it is performing its regular sealing operation and also prevents it from turning on the mounting shoe 6 when the mounting shoe 6 is being used to twist a closure cap onto a container.

A preferred embodiment of the closure engaging surface of the sealing cover 7 is illustrated in FIG. 3. In order to enable the sealing cover 7 to readily accommodate itself to the closure surface and to add further to the resilient container gripping characteristics of the gripping surface of the sealing cover 7, several spaced radial grooves 14 are formed therein and intermediate these a plurality of radially directed knife cuts 15 are formed.

Where sealing machines are being used to apply closure caps with relatively high torques, the tendency of the covers to slip on the mounting shoes increases. This interferes with the torque control and may cause the closure caps to be applied with either objectionally high or low torque. FIG. 4 and FIG. 1 illustrate at 16 another embodiment of the sealing cover having keys which provide an additional interlock between the mounting shoe and the cover. Thus, as best illustrated in FIG. 4 a radially directed slot 17 is formed in the cover 16 which is adapted to receive a complementary downwardly extending key 18 provided on the shoe 19 (FIG. 1). An additional locking action may also be provided by providing projecting keys 21 on the cover such as the upwardly extending circular keys 21 as illustrated in FIG. 4. Such keys are preferably formed as an integral part of the cover during the cover molding operation. These keys engage complementary circular apertures 20 formed in the lower surface of the shoe 19 as illustrated in FIG. 1.

It will be seen that an improved resilient sealing cover has been provided which is readily replaceable so that replacement expense and inconvenience have been substantially eliminated. This pad therefore eliminates one serious problem which is found in present sealing machines and particularly in modern high speed sealing machines where the high speed of operation and the torque requirements of vacuum sealing require frequent replacement of these sealing covers. Formerly such replacement most frequently required removal of parts which were sent back to the machine manufacturer for molding and vulcanizing or at least required a complicated replacement involving the removal of intricate locking parts and bolts or screws. The sealing cover of the present invention requires only a simple stripping and replacing operation which may be quickly performed by the regular machine operator at any time when necessary. The change may be quickly made with only a momentary stopping of the packing operation. Such a simple replacement not only eliminates costly replacement steps and shut downs but it also encourages more frequent replacement of these important parts of the sealing machines so that better seals are maintained and sealed product rejects are lessened.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A replaceable friction cover for a sealing machine plunger comprising a member formed of resilient rubberlike material adapted for being removably mounted on the plunger and having a plunger gripping portion adapted to yieldably engage a complementary portion of the plunger, and the bottom surface of said member having a plurality of grooves formed therein.

2. The friction cover as claimed in claim 1 which further comprises a recess therein positioned to engage a complementary key member on the plunger.

3. The friction cover as claimed in claim 1 which further comprises a projecting key positioned to engage a complementary recess in the plunger.

4. The friction cover as claimed in claim 1 in which said material is neoprene.

5. The friction cover as claimed in claim 1 in which said member has a plurality of knife slits therein intermediate said grooves.

6. A replaceable resilient cover for sealing machine sealing head member comprising a member of rubberlike material having an upwardly facing channel in its top surface adjacent its outer edges adapaed to engage a complementary flange on the sealing head member and an inwardly facing groove in the outer edge of said channel adapted to engage a complementary bead on the outer edge of the sealing head member flange.

7. The friction cover as claimed in claim 6 which further comprises a locking key on one of said members and a complementary recess in the other of said members positioned to accommodate said key.

8. The cover as claimed in claim 6 wherein said member comprises neoprene.

9. The cover as claimed in claim 6 wherein the bottom portion of said disc-like member is generally circular and has a plurality of radially directed grooves therein.

10. The cover as claimed in claim 9 wherein said disc-like member has a plurality of radially directed knife cuts intermediate said grooves.

11. In a container sealing machine the combination of a sealing head, a sealing shoe attached thereto, a resilient sealing cover detachably mounted on said shoe, a locking flange on said shoe, and a locking channel in said cover adapted to releasably engage said flange.

12. In a container sealing machine the combination of a sealing head, a sealing shoe member attached thereto, a resilient disc-like sealing cover member detachably mounted on said shoe member, a locking flange on said shoe member, an outwardly facing bead on said flange, a channel in the top of said cover member adapted to releasably engage said flange, and a groove in the outer edge of said channel adapted to receive said bead.

13. The machine as claimed in claim 12 which further comprises a plurality of grooves in the bottom of said sealing cover.

14. The machine as claimed in claim 12 in which said sealing cover comprises neoprene.

15. The machine as claimed in claim 12 which further comprises a locking key on one of said members and a complementary recess in the other of said members positioned to accommodate said key.

16. A replaceable friction cover for a sealing machine plunger comprising a member formed of resilient rubberlike material adapted for being removably mounted on the plunger and having a plunger gripping portion adapted to frictionally engage a portion of the plunger, and the bottom surface of said member having a plurality of grooves formed therein.

17. A replaceable friction cover for a sealing machine plunger comprising a member formed of resilient rubberlike material adapted for being removably mounted on the plunger and having a plunger gripping portion adapted to frictionally engage a portion of the plunger, the bottom surface of said member having a plurality of grooves formed therein, and a plurality of knife slits in said member intermediate said grooves.

18. A replaceable friction cover for a sealing machine plunger member comprising a resilient rubberlike member adapted for being removably mounted on the plunger member and having a plunger gripping portion adapted to frictionally engage a portion of the plunger member, the bottom surface of said resilient member having a plurality of grooves formed therein, and a locking key on one of said members and a complementary recess in the other of said members positioned to accommodate said key.

19. A replaceable friction cover for a sealing machine plunger comprising an annular member formed of resilient rubberlike material adapted for being removably mounted on the plunger and having a plunger gripping portion adapted to frictionally engage a portion of the plunger, and the bottom surface of said member having a plurality of radially directed grooves formed therein.

References Cited in the file of this patent

UNITED STATES PATENTS

| | | |
|---|---|---|
| 2,026,118 | Barnby | Dec. 31, 1935 |
| 2,885,851 | Aldington | May 12, 1959 |
| 2,996,853 | Hohl | Aug. 22, 1961 |